United States Patent
Blewett

(10) Patent No.: US 8,312,099 B1
(45) Date of Patent: Nov. 13, 2012

(54) PSEUDO PROXY SERVER

(75) Inventor: Charles Douglas Blewett, Morris County, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 0 days.

(21) Appl. No.: 11/239,888

(22) Filed: Sep. 30, 2005

Related U.S. Application Data

(60) Continuation of application No. 10/306,610, filed on Nov. 27, 2002, now abandoned, which is a division of application No. 09/217,610, filed on Dec. 22, 1998, now Pat. No. 6,526,448.

(51) Int. Cl.
 *G06F 13/00* (2006.01)
(52) U.S. Cl. .......... 709/213; 709/216; 709/224; 707/10
(58) Field of Classification Search .......... 709/203, 709/219, 225, 238, 218, 229, 224, 228, 226, 709/227, 220; 370/230
See application file for complete search history.

(56) References Cited

U.S. PATENT DOCUMENTS

| | | | |
|---|---|---|---|
| 5,291,550 A | 3/1994 | Levy | |
| 5,530,744 A | 6/1996 | Charalambous | |
| 5,583,994 A * | 12/1996 | Rangan | 709/219 |
| 5,678,041 A * | 10/1997 | Baker et al. | 707/9 |
| 5,719,854 A * | 2/1998 | Choudhury et al. | 370/231 |
| 5,745,697 A | 4/1998 | Charny | |
| 5,787,470 A | 7/1998 | DeSimone | |
| 5,802,062 A | 9/1998 | Gehani | |
| 5,805,599 A | 9/1998 | Mishra | |
| 5,805,820 A | 9/1998 | Bellovin | |
| 5,860,071 A | 1/1999 | Ball | |
| 5,870,557 A | 2/1999 | Bellovin | |
| 5,878,218 A * | 3/1999 | Maddalozzo et al. | 709/213 |
| 5,897,632 A | 4/1999 | Dar | |
| 5,931,904 A | 8/1999 | Banga | |
| 5,933,849 A | 8/1999 | Srbljic | |
| 5,946,324 A | 8/1999 | Mishra | |
| 5,958,052 A | 9/1999 | Bellovin | |
| 5,974,028 A | 10/1999 | Ramakrishnan | |
| 6,021,426 A | 2/2000 | Douglis | |
| 6,047,328 A | 4/2000 | Charny | |
| 6,047,332 A * | 4/2000 | Viswanathan et al. | 709/245 |
| 6,070,191 A * | 5/2000 | Narendran et al. | 709/226 |
| 6,075,796 A | 6/2000 | Katseff | |
| 6,078,956 A * | 6/2000 | Bryant et al. | 709/224 |
| 6,119,171 A * | 9/2000 | Alkhatib | 709/245 |
| 6,154,811 A | 11/2000 | Srbljic | |
| 6,170,013 B1 * | 1/2001 | Murata | 709/229 |
| 6,253,234 B1 * | 6/2001 | Hunt et al. | 709/213 |
| 6,269,078 B1 | 7/2001 | Lakshman | |
| 6,308,216 B1 * | 10/2001 | Goldszmidt et al. | 709/236 |
| 6,310,857 B1 | 10/2001 | Duffield | |
| 6,330,561 B1 | 12/2001 | Cohen | |
| 6,343,313 B1 * | 1/2002 | Salesky et al. | 709/204 |
| 6,438,101 B1 | 8/2002 | Kalampoukas | |
| 6,470,389 B1 | 10/2002 | Chung | |
| 6,473,401 B1 * | 10/2002 | Kong et al. | 370/229 |
| 6,473,796 B2 * | 10/2002 | Tanaka | 709/224 |

(Continued)

*Primary Examiner* — Khanh Dinh

(57) ABSTRACT

A pseudo proxy server is provided for a host network when the host network experiences periods of congestion. The host network determines whether an arrival rate of data requests exceeds a predetermined threshold. If so, the host network adds an address of a pseudo proxy server to a list of servers aliased to the host network. Thereafter, data requests are routed to the pseudo proxy server on a round robin basis. The pseudo proxy server may be engaged without first loading information content from the host network on the pseudo proxy server.

20 Claims, 2 Drawing Sheets

U.S. PATENT DOCUMENTS

| | | | |
|---|---|---|---|
| 6,536,037 B1 * | 3/2003 | Guheen et al. | 717/151 |
| 6,578,113 B2 | 6/2003 | Krishnamurthy | |
| 6,711,128 B1 | 3/2004 | Ramakrishnan | |
| 7,769,834 B2 * | 8/2010 | Ly et al. | 709/220 |
| 7,861,174 B2 * | 12/2010 | Krasnoiarov et al. | 715/736 |
| 7,886,016 B1 * | 2/2011 | Tormasov | 709/213 |

* cited by examiner

PSEUDO PROXY SERVER

CROSS-REFERENCE TO RELATED APPLICATIONS

This is a continuation of application Ser. No. 10/306,610 filed Nov. 27, 2002, now abandoned which was a division of application Ser. No. 09/217,610 filed Dec. 22, 1998, now U.S. Pat. No. 6,526,448 issued Feb. 25, 2003, both of which are hereby incorporated by reference as though fully set out herein.

BACKGROUND

The present invention provides a resource management scheme for a content provider in a computer network.

Predicting web server capacity can be a problem with serious financial repercussions. Often a hosting provider maintains a computer network and leases capacity to a content provider. The hosting provider may be contractually obligated to guarantee that it will provide server capacity sufficient to meet demand to the content provider's site. A failure to meet demand may mean lost revenue for the content provider. A failure to meet capacity guarantees may mean lost revenue to the hosting provider. On the other hand, providing static capacity for a content provider may be financially disadvantageous to the hosting provider. If a server is dedicated for the use of a first content provider but is under used, the excess capacity could be used to service a second content provider and generate additional revenues.

Ideally, a hosting provider would provide server resources to a content provider in a manner that ebbs and flows with the demand for service from the provider's site. New servers would be added to the provider's site as the demand for the site increases. The new server may be included in a round robin DNS pool of machines and aliased to a particular host name. However, the act of booting up a server and loading it with information content from the content provider takes time. It may not be possible to load the server in enough time to meet a sharp, unexpected rise in customer demand. Accordingly, there is a need in the art for a resource management scheme for host networks that dedicates new servers to host sites in real-time with escalating demand.

SUMMARY

According to an embodiment of the present invention, a pseudo proxy server is provided for a host network when the host network experiences periods of congestion. When a data request is received at the host network, the host network determines whether an arrival rate of data requests exceeds a predetermined threshold. If so, the host network adds an address of a pseudo proxy server to a list of servers aliased to the host network. Thereafter, data requests are routed to the pseudo proxy server on a round robin basis. The pseudo proxy server may be engaged without first loading information content from the host network on the pseudo proxy server.

DETAILED DESCRIPTION

The present invention provides a pseudo proxy server system in which unregistered servers may be made to act as if they are part of a host network on a rolling basis. The pseudo proxy server may be added to a pool of servers and provide service to customer requests immediately. According to the present invention, there is no need to copy content from the content provider to the new server prior to use. Instead, the pseudo proxy server accepts customer requests immediately and copies content only as it is requested.

Figure 1:
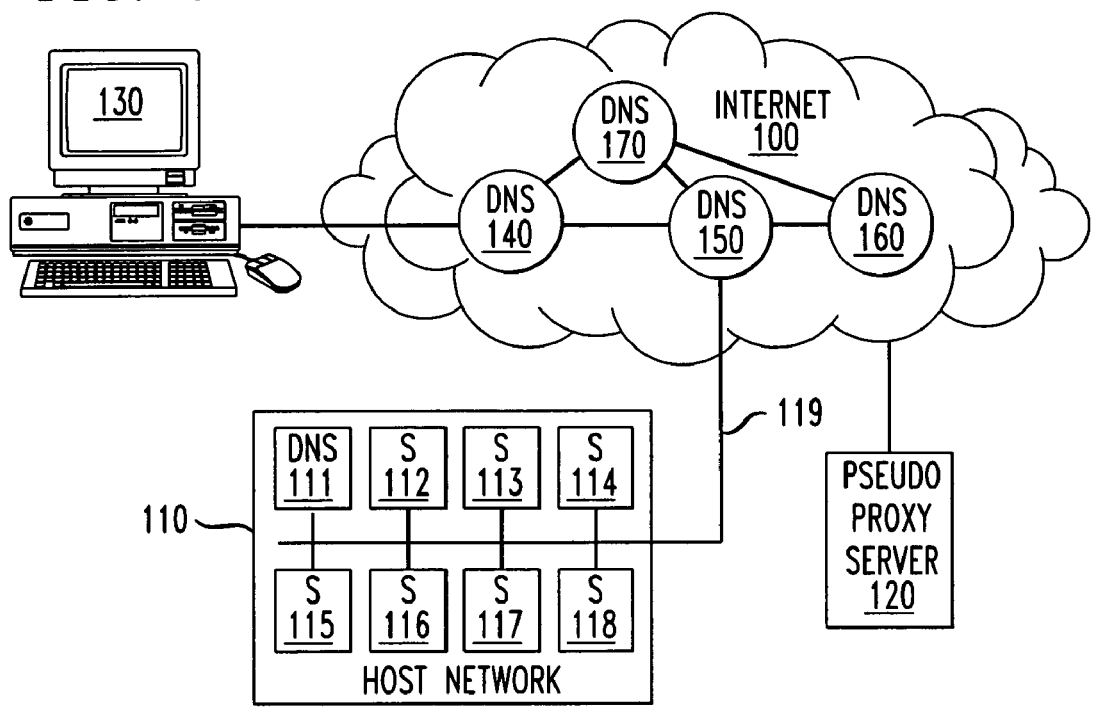
FIG. 1 is a block diagram of a computer network constructed in accordance with an embodiment of the present invention.

FIG. 1 illustrates a block diagram of a pseudo proxy server implemented according to an embodiment of the present invention. FIG. 1 illustrates an Internet 100, a host network 110, a pseudo proxy server 120 and a client terminal 130. The host network 110 may be populated by a DNS server 111 and a plurality of content servers 112-118. The host network may be connected to the Internet via a interface line 119 such as a Ti telephone line or the like.

The content servers 112-118 store information content that has been preloaded by content providers or the like. The content servers 112-118 respond to connection requests from client terminal 130 and the like according to convention techniques in the art. The content servers 112-118 also engage in a coordinated network management process to monitor the performance of the host network 110. As is known, a "monitoring process" of the host network 110 monitors, for example, bandwidth availability on line 119, disk or CPU availability of the various content servers 112-118 and other operating conditions of the host network 110 that relate to its ability to handle other connection requests. The known http log monitoring process is an example of such a monitoring process.

The DNS server 110 stores a "DNS pool" (not shown), a table that associates a machine name of the host network 110 with the IP addresses of the content servers 112-118. An example of a machine name is "www.att.com." Typically, when the DNS is presented with the machine name of the host network 110, it retrieves an IP address of one of the content servers 112-118 on a round robin basis. A client terminal 130, once it has received the IP address of a content server 112 would direct a connection request to the IP address. As is known, a DNS server 111 may be provided within the host network 110 as shown in FIG. 1 but also may be provided elsewhere on Internet 100.

The pseudo proxy server 120 is a traditional computer server. Typically, it is provided in communication with Internet 100 from a location that is spatially separated from the host network 110.

As is typical in the art, each of the content servers 112-118 and the pseudo proxy server 120 possess connect queues (not shown) in which they are able to receive and buffer a predetermined number of connection requests. As is known, the incoming requests are queued in an operating system kernel. The number of connection requests that can be buffered by a single server is finite and predetermined. When a content server (say, server 112) buffers its maximum number of connection requests, any additional connection requests to that content server 112 fail. As noted, failed connection requests are undesirable.

Figure 2:
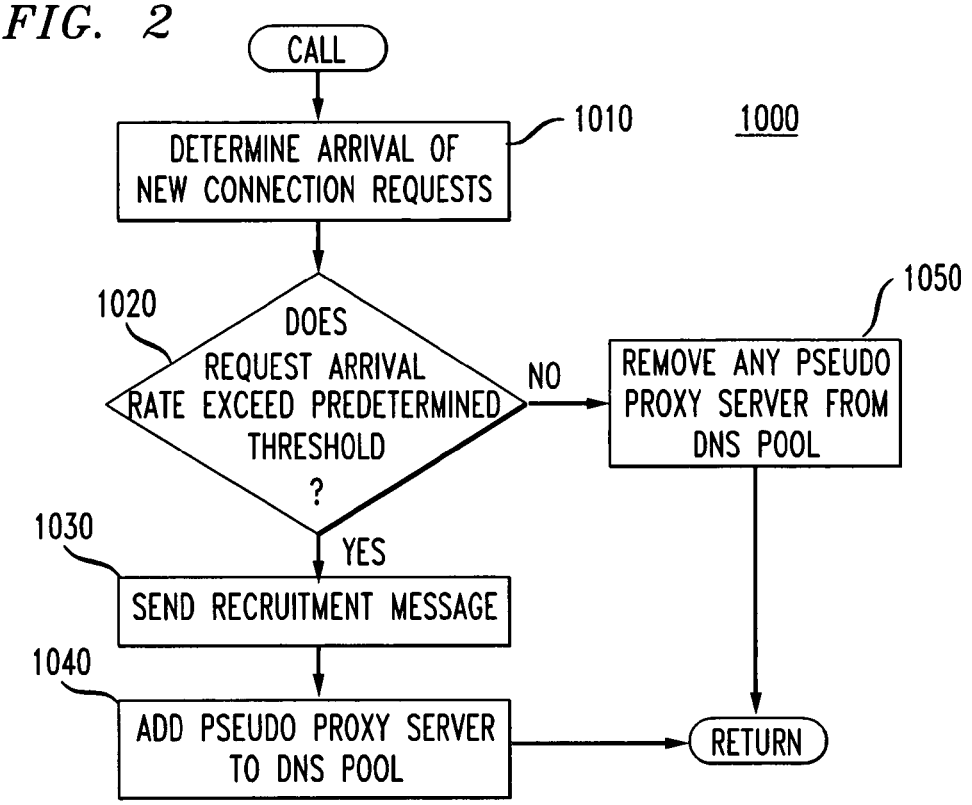
FIG. 2 is a flow diagram of a method of the host network conducted in accordance with an embodiment of the present invention.

FIG. 2 illustrates a method of operation that may be conducted by the monitoring process in accordance with an embodiment of the present invention. The method may be invoked periodically, such as once per minute, or upon the receipt of a new connection request to the host network 110. According to the method, the monitoring process measures an arrival rate of new connection requests (Step 1010). The monitoring process also determines whether the arrival rate of customer requests exceeds a predetermined threshold (Step 1020). If so, the monitoring process causes the pseudo proxy server 120 to be signaled with a "recruitment" message to indicate that the pseudo proxy server 120 should thereafter provide service on behalf of the host network 110 (Step 1030). The monitoring process adds an address of the pseudo proxy server 120 to the DNS pool (Step 1040).

If, at step 1020, the host network is not operating in a congested state, the monitoring process removes the IP address of any pseudo proxy server from the DNS pool (Step 1050).

Typically, the predetermined threshold is established according to capacity limitations of the host network 110. For example, it may be set to 95% of the total capacity of content servers 112-118 or, if the capacity of line 119 could be bandwidth-limiting to the host network 110, to 95% of the bandwidth limit of line 119.

During peak loading periods, when the arrival rate exceeds the predetermined capacity threshold, a first call to the method 1000 will cause the address of the pseudo proxy server to be added to the DNS pool. Thereafter, name server requests to the DNS server 111 will cause the IP address of the pseudo proxy server 120 to be returned to the client terminal 130. The client terminal 130 will direct its connection request to the pseudo proxy server 120 rather than a content server of the host network 110. Thus, requests to the congested content servers 112-118 will decrease instantly by a factor of $1/(n+1)$, where n is the number of content servers provided in the host network 110. This decrease in customer requests that are processed within the host network 110 permits the congested content servers 112-118 to reduce the number of buffered requests and work their way out of a congested state.

The present invention cooperates with traditional Internet routing. As is known, the Internet 100 also is populated by a number of DNS servers 140-170 organized into a predetermined hierarchy of levels. When a client terminal 130 attempts to connect to a host network 110, it communicates with a closest DNS server 140 to resolve the host's machine address (www.att.com) to an IP address. The DNS server 140 may or may not have stored a copy of the DNS pool stored by DNS 111. If it does not, the DNS server 140 communicates with other DNS servers of the Internet 100 to resolve the machine address into an IP address. Once DNS server 140 obtains a copy of the DNS pool, it selects one of the IP addresses and provides it to the client terminal 130. The client terminal directs a connection request to the selected content server (say, server 112).

After the machine address is resolved, the DNS server 140 also stores the DNS pool locally. If it receives the same machine address from the same client terminal (or another terminal), it may resolve the machine address without having to communicate with other servers. Typically, each DNS server 140-180 of the Internet 100 stores a DNS pool only for a predetermined time; they expire when the predetermined time period concludes.

After the congestion events subside, the DNS servers' association between the pseudo proxy server and the host network's Internet address will expire according to known techniques.

The method 1000 may continue to operate even after a first pseudo proxy server 120 is engaged. If the rate of connection requests to the host network 110 continues to rise and the host network again reaches a congestion condition, the method 1000 may engage additional pseudo proxy servers (not shown).

Figure 3:
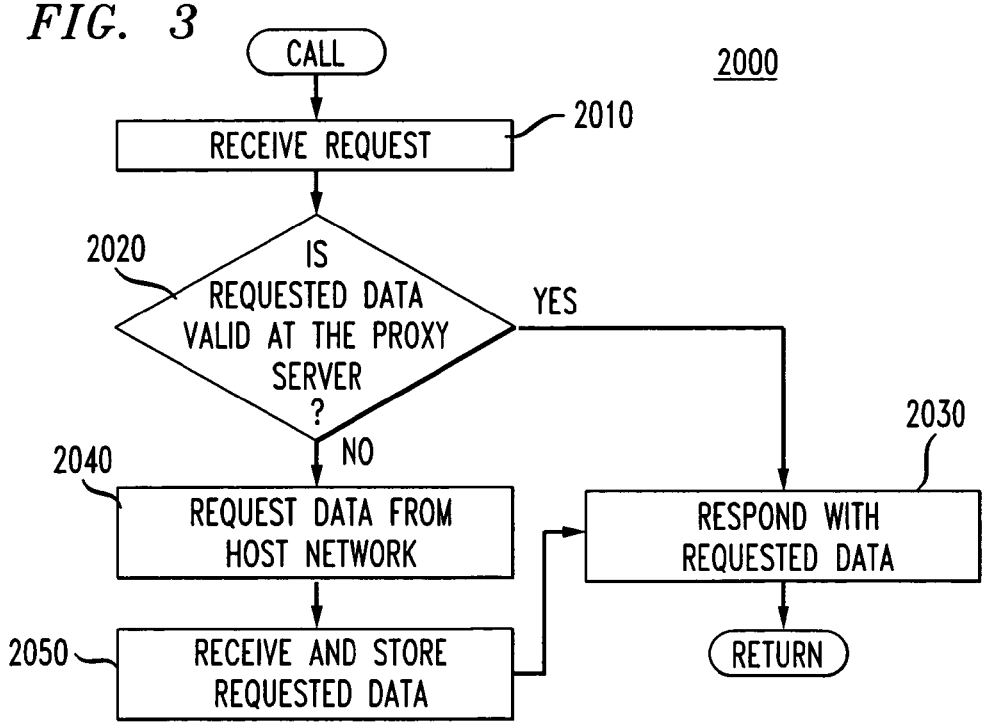
FIG. 3 is a flow diagram of a method of the pseudo proxy server conducted in accordance with an embodiment of the present invention.

Returning to FIG. 1, it will be appreciated that a percentage of customer requests are routed to the pseudo proxy server 120 located elsewhere in Internet 100. As noted above, the pseudo proxy server 120 is not pre-loaded with information content from the host network 110. FIG. 3 illustrates a method of operation of the pseudo-proxy server 120 conducted in accordance with an embodiment of the present invention.

The method 2000 may begin when the pseudo proxy server 120 receives a request that has been routed to it (Step 2010). Upon receipt, the pseudo proxy server 120 determines whether it possesses valid data that can satisfy the data request (Step 2020). If so, the pseudo proxy server 120 furnishes the requested data in response to the data request (Step 2030).

If the pseudo proxy server 120 cannot satisfy the data request, it requests data from the host network 110 (Step 2040). Upon receipt of the requested data, the pseudo proxy server 120 stores the data (Step 2050) and furnishes it in response to the data request at Step 2030.

In many applications, when a host network experiences an unexpectedly high number of data requests, the requests typically request the identical information. Consider, as an example, an application where a host network 110 stores news. Exemplary Internet news services, at the time of this writing, may be found at www.cnn.com and www.washingtonpost.com. There may be others. These networks may store a variety of information content related to news items as diverse as national news, international news, sports and the arts. Within each topical category of news, there may be hundreds of articles relating to various newsworthy events. However, in a typical application, when a news organization experiences a unexpectedly high demand for information content, the demand will be related to a breaking news event—one that is covered in a single or very few number of news articles.

If the pseudo proxy server 120 were used to provide overflow service in such an event, operation of the method 2000 of FIG. 3 will cause the pseudo proxy server 120 to receive a number of data requests, each directed to the same article or set of articles. Upon receipt of the first such request, the pseudo proxy server 120 would not have a copy of the article stored locally. It would progress through Steps 2040 and 2050 to obtain one from the host network 110. Thereafter, however, when it continues to receive requests to the same article describing breaking news, the pseudo proxy server 120 would have a copy of the article stored locally and would furnish it in a response without having to contact the host network 110 according to steps 2040-2050. Again, the pseudo proxy service permits a server to be placed in service without having to store a priori all information content from the host network 110 locally at the pseudo proxy server 120.

During use, the pseudo proxy server 120 may receive several requests for the same information simultaneously. That is, it may receive two requests for the same information sequentially. In response to the first received request, the pseudo proxy server 120 obtains the requested data from the host network 110. The pseudo proxy server 120 may process transactions in such a way that it begins processing of a second transaction before processing of a first transaction has completed. In such an embodiment, the pseudo proxy server 120 may begin processing of the second data request before data associated with the first transaction has been received from the host network 110 according to Step 2050. The pseudo proxy server 120 preferably contains software control that, for a second data request, "looks ahead" and determines whether the server 120 will receive the requested data pursuant to an earlier-received (first) data request. In such a case, the pseudo proxy server 120 may stall processing of a second data request to the same information content to avoid communicating twice with the congested host network 110.

The pseudo proxy server 120 may perform any number of checks to determine whether it stores a valid copy of requested data locally. In a first simplest embodiment, it may determine that data is valid if it possesses a copy of the requested data. In other embodiments, a host network may define that information content from the network is valid only for a predetermined time. For example, according to the known Hypertext Transfer Protocol ("HTTP"), data may be assigned an expiration time; data is considered valid until the expiration time is reached. Even if the pseudo proxy server 120 stores a copy of the requested data, it may determine that the copy is invalid because its age exceeds the predetermined time defined by the host network 110. If the copy of data is invalid because it is too old, the pseudo proxy server 120 obtains another newer copy of the data according to Steps 2040-2050.

In other embodiments, the host network 110 may be configured to broadcast messages to invalidate data stored by its own content servers 112-118 and any pseudo proxy servers 120 that may be acting on its behalf. These "kill" messages may be broadcast by the host network 110 when information content of a data item changes. Typically, a data item is amended by a user. When the data item is amended, a server in the host network 110 addresses a kill message to all servers listed in the DNS pool of router 111. The kill message identifies the old data item. In response, the servers 112-118, 120 mark the old data items (if any are stored) as invalid.

Figure 4:
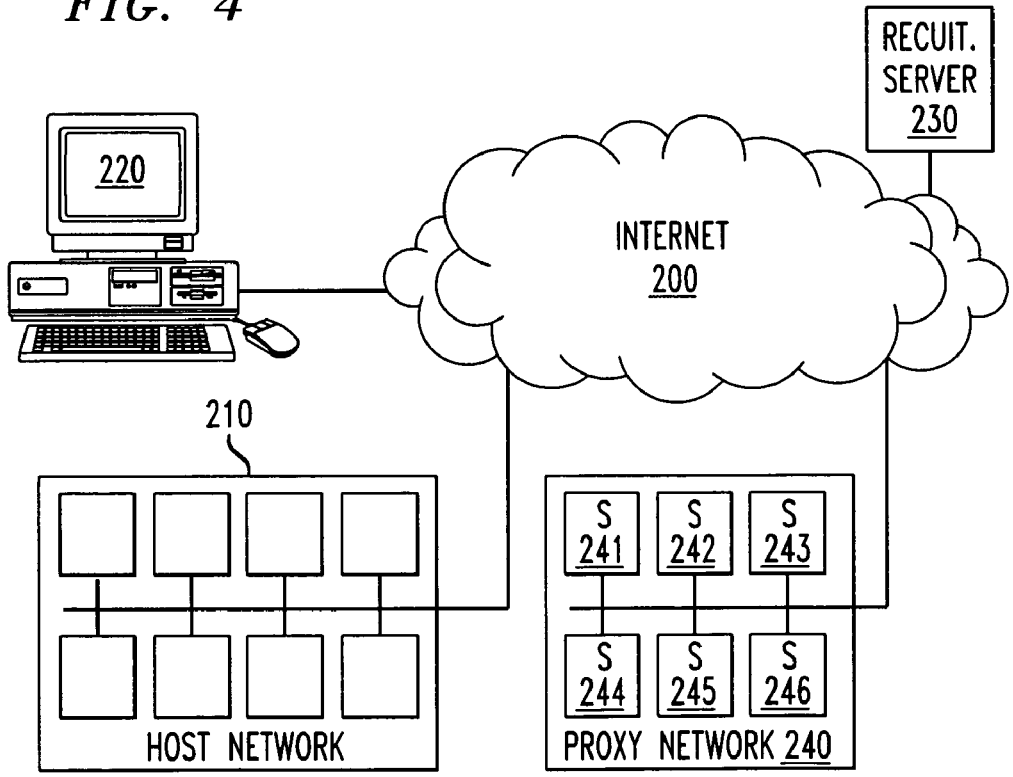
FIG. 4 is a block diagram of a computer network constructed in accordance with an embodiment of the present invention.

According to an embodiment of the present invention, a pseudo proxy service may be provided as a network service to content providers. FIG. 4 illustrates a computer network constructed in accordance with such an embodiment. There, an Internet 200 is provided in communication with a host network 210 and a client terminal 220. The Internet 200 also is provided in communication with a recruitment server 230 and a proxy network 240. The proxy network 240 may be populated servers 241-246 according to any number of known network topologies.

The recruitment server 230 performs administrative processes related to the pseudo proxy service. It maintains a table of all servers that may provide the pseudo proxy service to host networks. In the example of FIG. 4, the recruitment server 230 would maintain addresses of servers 242-246. The recruitment server 230 may possess other functionality that would be conventional to a commercial service. For example, it may perform validation and billing functions that are typical to many commercial computer implemented services.

In the embodiment of FIG. 4, the monitoring process of the host network 210 may operate in accordance with the method 1000 of FIG. 2. If the monitoring process reaches step 1030, the monitoring process directs the recruitment messages to the recruitment server 230. The recruitment server 230 recalls an address of an available server in the pseudo proxy network 240 (say, server 242) and returns the address to the host network 210 monitoring process. Thereafter, the method 1000 proceeds normally.

Before providing the IP address of the selected server 242 to the host network 110, the recruitment server 230 communicates with the selected server 242 and provides it with information indicating that it should provide overflow support for host network 210. In the embodiment of FIG. 4, the method 2000 of FIG. 3 may be performed by the server 242 selected by the recruitment server.

The principles of the present invention also are applicable to extend server operations that require execution of server processing to fulfill data requests. A common example is the known Common Gateway Interface ("CGI"), a tool commonly used for creating web pages dynamically, among others. According to an embodiment of the present invention, when a pseudo proxy server 120 (FIG. 1) encounters a data request that requires execution of a CGI process, (and the pseudo proxy server 120) does not store the process, the pseudo proxy server requests the process from the host network 110. (FIG. 3, Step 2040) along another that may be required to complete the data request (e.g. web page content). In this embodiment, the request made by the pseudo proxy server 120, at step 2040 identifies the pseudo proxy server's status and distinguishes it from client terminals such as terminal 130. In response, the host network 110 transfers the processes (and data, if requested) to the pseudo proxy server 120. Once received, the pseudo proxy server executes the process and completes the data request.

One of the benefits of the present invention is that the pseudo proxy 120 may be employed without having to modify any communication protocols that may be defined for the client terminal 130. The addition or removal of a pseudo proxy server 120 is transparent to the client terminal 130. In this manner, the pseudo proxy server 120 operates differently than known proxies which typically have their own predefined protocol.

Several embodiments of the present invention are specifically illustrated and described herein. However, it will be appreciated that modifications and variations of the present invention are covered by the above teachings and within the purview of the appended claims without departing from the spirit and intended scope of the invention.

The invention claimed is:

1. A method for use by a server that has been caused to fulfill requests for data items that would otherwise be fulfilled by a content source that stores the data items, the server having been caused to fulfill the requests responsive to a determination that additional capacity for fulfilling the requests is needed, the method comprising:
   the server receiving the requests via the Internet,
   the server making a determination as to whether it possesses each data item requested of it; if the determination is that the server does not possess a requested data item, the server, in response to its said determination, obtaining the requested data item from the content source; and the server fulfilling the request for the requested data item upon obtaining the requested data item from the content source,
   wherein the server and the content source are connected to the Internet,
   and wherein the requests originate from client terminals that are connected to the Internet via other than the server and via other than the content source.

2. The invention of claim 1 wherein one of the requests via the Internet for at least one of the data items is received by the server prior to the server having received at least one of the data items from the content source.

3. The invention of claim 1 wherein the server carries out the method only subsequent to receiving a recruiting message indicating that it should fulfill requests for said data items stored at the content source.

4. The invention of claim 2 wherein the server carries out the method only subsequent to receiving a recruiting message indicating that it should fulfill requests for said data items stored at the content source.

5. The invention of claim 3 wherein the recruiting message is received from a recruitment server that had received a message from the content source generated upon the determination that additional capacity for fulfilling the requests was needed.

6. The invention of claim 1 wherein the contents of said data items are controlled by a content provider and use of the server is provided to the content provider by a pseudo proxy service provider that bills the content provider for that use.

7. The invention of claim 1 wherein the content source is a network of one or more web servers and wherein at least ones of the data items are web pages.

8. A server for fulfilling requests for data items that would otherwise be fulfilled by a content source connected to the Internet that stores the data items, the fulfilling being responsive to a determination that additional capacity for fulfilling the requests is needed, the server being adapted to:
receive the requests via the Internet,
make a determination as to whether it possesses each data item requested of it, and if the determination is that the server does not possess a requested data item, to obtain the requested data item from the content source in response to the server's said determination and to fulfill the request for the requested data item upon obtaining the requested data item from the content source.

9. The invention of claim 4 wherein the recruiting message is received from a recruitment server that had received a message from the content source generated upon the determination that additional capacity for fulfilling the requests was needed.

10. A method for fulfilling data requests at a pseudo proxy server, comprising:
1) the pseudo proxy server receiving information indicative of the fact that said pseudo proxy server should provide overflow support for a particular content server by responding to requests for data items that are stored at the content server, and
2) the pseudo proxy server thereafter responding to a request received at the pseudo proxy server via the Internet for a data item stored at the content server, by
  a) making a determination as to whether the pseudo proxy server possesses the data item, and
  b) if not, then in response to its determination that it does not possess the data item, the pseudo proxy server requesting the data item from the content server and the pseudo proxy server furnishing the data item in a response when it is received from the content server,
wherein the pseudo proxy server and the content server are connected to the Internet,
and wherein the requests originate from client terminals that are connected to the Internet via other than the pseudo proxy server and via other than the content server.

11. The method of claim 10 wherein the determination includes making a determination as to whether the pseudo proxy server has a copy of the requested data item stored locally.

12. The method of claim 10 wherein the determination includes making a determination as to whether the pseudo proxy server has a copy of the requested data item stored locally and whether an age of the copy is less than a predetermined age limit for data items.

13. The method of claim 10 further comprising, if the pseudo proxy server possesses the data item but the data item is not valid, requesting the data item from the content server before furnishing the data item.

14. The method of claim 10 further comprising storing the data item when it is received from the content server.

15. The method of claim 14 further comprising, thereafter, when subsequent requests for the data item are received, furnishing a copy of the stored data item in response to the data request.

16. The method of claim 10 wherein said information was received by said pseudo proxy server from a recruitment server that had previously stored an address of said pseudo proxy server and that had received a recruitment message from the content server that had caused the recruitment server to identify a server that could serve as a pseudo proxy server for said content server.

17. The method of claim 10 wherein prior to said pseudo proxy server having received said information, none of the content of said content server was stored at said pseudo proxy server.

18. The method of claim 10 further comprising:
3) the pseudo proxy server receiving second information indicative of the fact that said pseudo proxy server should provide overflow support for a particular second content server by responding to requests for data items that are stored at the second content server, and
4) the pseudo proxy server thereafter responding to a request received at the pseudo proxy server for a second data item stored at the second content server, by
  a) making a determination as to whether the pseudo proxy server possesses the second data item, and
  b) if not, then in response to its determination that it does not possess the second data item, pseudo proxy server requesting the second data item from the second content server and the pseudo proxy server furnishing the second data item in a response when it is received from the second content server.

19. The method of claim 18 wherein said information and said second information were received by said pseudo proxy server from a recruitment server that had previously stored an address of said pseudo proxy server and that had received recruitment messages from the content server and the second content server, those recruitment messages having caused the recruitment server to identify a server that could serve as a pseudo proxy server for said content server and said second content server.

20. The method of claim 19 wherein prior to said pseudo proxy server having received said information, none of the content of said content server was stored in said pseudo proxy server and wherein prior to said pseudo proxy server having received said second information, none of the content of said second content server was stored in said pseudo proxy server.

* * * * *